United States Patent
Makowski et al.

(10) Patent No.: US 9,150,084 B2
(45) Date of Patent: Oct. 6, 2015

(54) INTRUSION MITIGATION DOOR BRACKET

(71) Applicant: Ford Global Technologies, LLC, Dearborn, MI (US)

(72) Inventors: Matthew B. Makowski, Northville, MI (US); Zhibing Deng, Northville, MI (US); Tahmidur Rahman, Canton, MI (US); Moises Blancas Galicia, Mexico City (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/096,155

(22) Filed: Dec. 4, 2013

(65) Prior Publication Data

US 2015/0151616 A1    Jun. 4, 2015

(51) Int. Cl.
*B60J 5/04* (2006.01)
*B62D 25/04* (2006.01)
*B62D 25/02* (2006.01)

(52) U.S. Cl.
CPC .............. *B60J 5/0456* (2013.01); *B60J 5/0425* (2013.01); *B60J 5/0426* (2013.01); *B60J 5/0429* (2013.01); *B60J 5/0451* (2013.01); *B62D 25/025* (2013.01); *B62D 25/04* (2013.01)

(58) Field of Classification Search
CPC ............ B60J 5/04; B60J 5/0412; B60J 5/042; B60J 5/0422; B60J 5/0423; B60J 5/0429; B60J 5/0443; B60J 5/0456; B62D 21/157; B62D 25/02; B62D 25/025; B62D 25/04

USPC ................... 296/146.5, 146.6, 146.9, 187.03, 296/187.12, 193.05, 203.03

See application file for complete search history.

(56) References Cited

U.S. PATENT DOCUMENTS

| | | | |
|---|---|---|---|
| 5,800,007 A | 9/1998 | Cho | |
| 6,203,096 B1 | 3/2001 | Noda et al. | |
| 6,846,033 B2* | 1/2005 | Chu et al. | 296/146.6 |
| 7,837,255 B1* | 11/2010 | Okutsu et al. | 296/187.12 |
| 7,857,375 B2 | 12/2010 | Huttsell et al. | |
| 7,992,920 B2* | 8/2011 | Deng et al. | 296/146.6 |
| 8,702,153 B2* | 4/2014 | Kurokawa et al. | 296/187.12 |
| 2002/0027379 A1* | 3/2002 | Czaplicki | 296/188 |
| 2002/0153742 A1* | 10/2002 | Ishikawa | 296/146.6 |
| 2010/0225141 A1* | 9/2010 | Mori | 296/146.6 |

FOREIGN PATENT DOCUMENTS

KR    20030000040 A    1/2003

OTHER PUBLICATIONS

I-Car Advantage Online, "The Audi A8 Door Assembly", Mar. 24, 2003, 2 pages, www.i-car.com.

* cited by examiner

*Primary Examiner* — Jason S Daniels
(74) *Attorney, Agent, or Firm* — Jason C. Rogers; Bejin Bieneman PLC

(57) ABSTRACT

A vehicle includes a rocker panel and a pillar reinforcement extending in a direction transverse to the rocker panel. The vehicle further includes a door having a bracket disposed over an intersection of the rocker panel and the pillar reinforcement when the door is in a closed position. The bracket is configured to reduce intrusion propagation of the door toward a passenger compartment and redirect an impact load laterally along the rocker panel.

18 Claims, 2 Drawing Sheets

INTRUSION MITIGATION DOOR BRACKET

BACKGROUND

Passenger vehicles undergo various crash tests to ensure compliance with regulatory standards. In the U.S., crash tests are conducted in accordance with the Federal Motor Vehicle Safety Standards as established by the National Highway Traffic Safety Administration. The Federal Motor Vehicle Safety Standards are divided into categories such as crash avoidance, crashworthiness, and post-crash survivability. A rating is given to each vehicle as a result of the testing. In the U.S., the rating is given in accordance with the New Car Assessment Program (NCAP).

DETAILED DESCRIPTION

An exemplary vehicle includes an intrusion mitigation system comprising passenger compartment with front and rear occupant areas, a rocker panel, and a pillar reinforcement extending in a direction transverse to the rocker panel. The intrusion mitigation system further includes a vehicle door having a bracket disposed on an interior surface within the vehicle door and over an intersection of the rocker panel and the pillar reinforcement when the vehicle door is in a closed position. The bracket has a lateral load-bearing surface and a longitudinal load-bearing surface that are configured to reduce intrusion propagation of the vehicle door toward the rear occupant area and redirect an impact load along the rocker panel.

The vehicle shown in the FIGS. may take many different forms and include multiple and/or alternate components and facilities. While an exemplary vehicle is shown, the exemplary components illustrated are not intended to be limiting. Indeed, additional or alternative components and/or implementations may be used. Moreover, the components shown are not necessarily drawn to scale.

Figure 1:
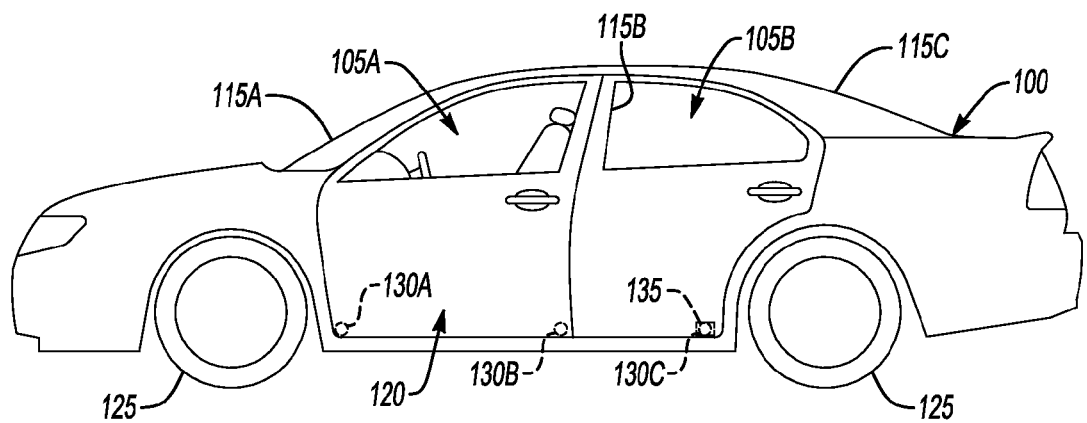
FIG. 1 illustrates an exemplary vehicle having an intrusion mitigation door bracket.

As illustrated in FIG. 1, the vehicle 100 includes a passenger compartment 105, a rocker panel 110, pillar reinforcements 115, and doors 120. While illustrated as a sedan, the vehicle 100 may include any passenger or commercial vehicle such as any car, truck, sport utility vehicle, crossover, etc.

The passenger compartment 105 may include an interior portion of the vehicle 100 where passengers may sit during operation of the vehicle 100. The passenger compartment 105 may include seats as well as components used for controlling the vehicle 100 such as pedals, a steering wheel, turn signals, climate controls, etc. The passenger compartment 105 may further include components such as an entertainment system, seat belts, airbags, storage areas, etc. The passenger compartment 105 may be divided into a front occupant area 105A located closer to the front of the vehicle 100 and a rear occupant area 105B located closer to a rear of the vehicle 100. Typically, the front seats are located in the front occupant area 105A and the rear seats are located in the rear occupant area 105B.

The rocker panel 110 may be located at a base of the door openings, below the doors 120. The rocker panel 110 may extend along the side of the vehicle 100 between a pair of wheels 125. The rocker panel 110 may be formed from metal material such as aluminum or steel or any other material with sufficient rigidity. In some instances, a trim may be placed over at least a portion of the rocker panel 110 for, e.g., aesthetics and protection against the elements and debris. The trim may be formed from, e.g., a plastic material. A rocker panel 110 may be located on each side of the vehicle 100.

The pillar reinforcements 115 may extend in a direction that is generally transverse to the rocker panel 110. While the rocker panels 110 generally extend horizontally between a pair of wheels 125, at least a portion of the pillar reinforcements 115 may generally extend more vertically, although not necessarily perpendicularly to the rocker panels 110. In some instances, however, at least a portion of the pillar reinforcement 115 may extend perpendicularly to at least a portion of the rocker panel 110. The pillar reinforcements 115 may meet the rocker panel 110 at multiple intersection points 130. Intersection points 130 may be located near each of the wheels 125 and approximately halfway between the wheels 125 or at a location where the front door 120 and rear door 120 meet. Different vehicles 100 may include different numbers of pillar reinforcements 115. For instance, a sedan may generally include three pillar reinforcements 115 on each side while a sport utility vehicle (SUV) or hatchback may include four pillar reinforcements 115 on each side. A pickup truck, however, may only have two pillar reinforcements 115. As shown in FIG. 1, the vehicle 100 may include an A-pillar 115A, a B-pillar 115B, and a C-pillar 115C.

The doors 120 may be configured to provide access to the passenger compartment 105. The vehicle 100 may include front doors 120 and rear doors 120 located on each side of the vehicle 100. The front doors 120 may be located closer to the front of the vehicle 100 and provide access to the front occupant area 105A. The rear doors 120 may be located closer to the rear of the vehicle 100 and provide access to the rear occupant area 105B. The doors 120 may be moved between an open position to allow access to the passenger compartment 105 and a closed position for when the vehicle 100 is unoccupied or when the vehicle 100 is moving. As shown in FIG. 1, the doors 120 are in the closed position.

An intrusion mitigation bracket 135 may be enclosed within the door 120. When the door 120 is in the closed position, as shown in FIG. 1, the bracket 135 may be disposed over one of the intersection points 130, such as the intersection point 130C near the intersection of the rocker panel 110 with the C-pillar 115C. Additional brackets 135 may be placed at other intersection points 130 (see, e.g., intersection points 115A and 115B). Placing the bracket 135 at the intersection points 130 of the rocker panel 110 and one or more of the reinforcement pillars may reduce intrusion propagation of the door 120 into the passenger compartment 105, and specifically the rear occupant area 105B for the example location shown in FIG. 1, and redirect an impact load along the rocker panel 110.

Figure 2:
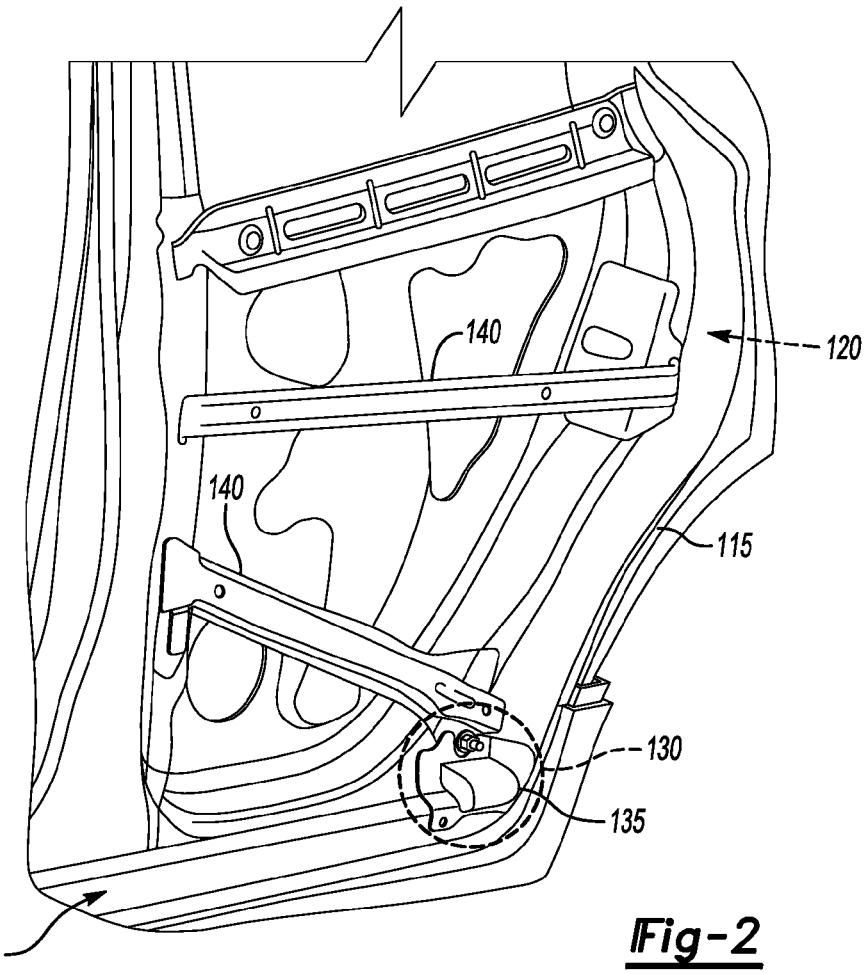
FIG. 2 illustrates the intrusion mitigation door bracket disposed within a door at an intersection of a rocker panel and a pillar reinforcement when the door is in a closed position.
Figure 4:
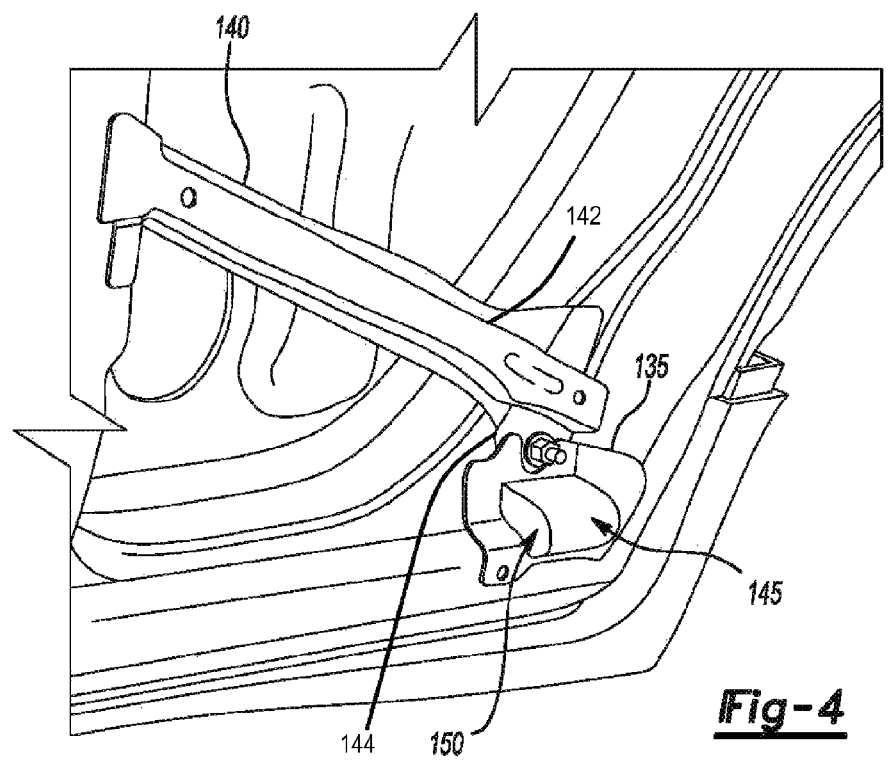
FIG. 4 illustrates the intrusion mitigation door bracket having a longitudinal load-bearing surface and a lateral load-bearing surface.

FIG. 2 illustrates the bracket 135 disposed within the door 120 at an intersection of the rocker panel 110 and the pillar reinforcement 115 when the door 120 is in the closed position. Portions of the door 120 are transparent in FIG. 2 for purposes of illustrating the location and orientation of the bracket 135 within the door 120 relative to the rocker panel 110 and the pillar reinforcement 115. As shown, the bracket 135 is oriented such that portions of the bracket 135 extend in directions that are transverse, and possibly perpendicular, to the rocker panel 110, the pillar reinforcement 115, or both. The door 120 may include support braces 140 extending between inner door 120 panels, which may be formed from sheet metal. The support braces 140 each have a spine 142 and a flange 144, shown in FIG. 4. The bracket 135 may be formed from a metal, such as aluminum or steel, and attached to one or more of the support braces 140 and/or another interior surface of the door 120. One way to attach the bracket 135 may be to bolt the bracket 135 to one or more of the support braces 140 vertically beneath the spine 142 and overlapping the flange 144, as shown in FIG. 4. By securing the bracket 135 to the interior of the door 120, the bracket 135 may remain fixed relative to the support braces 140 and inner door 120 panels regardless of whether the door 120 is in an open or closed position.

Figure 3:
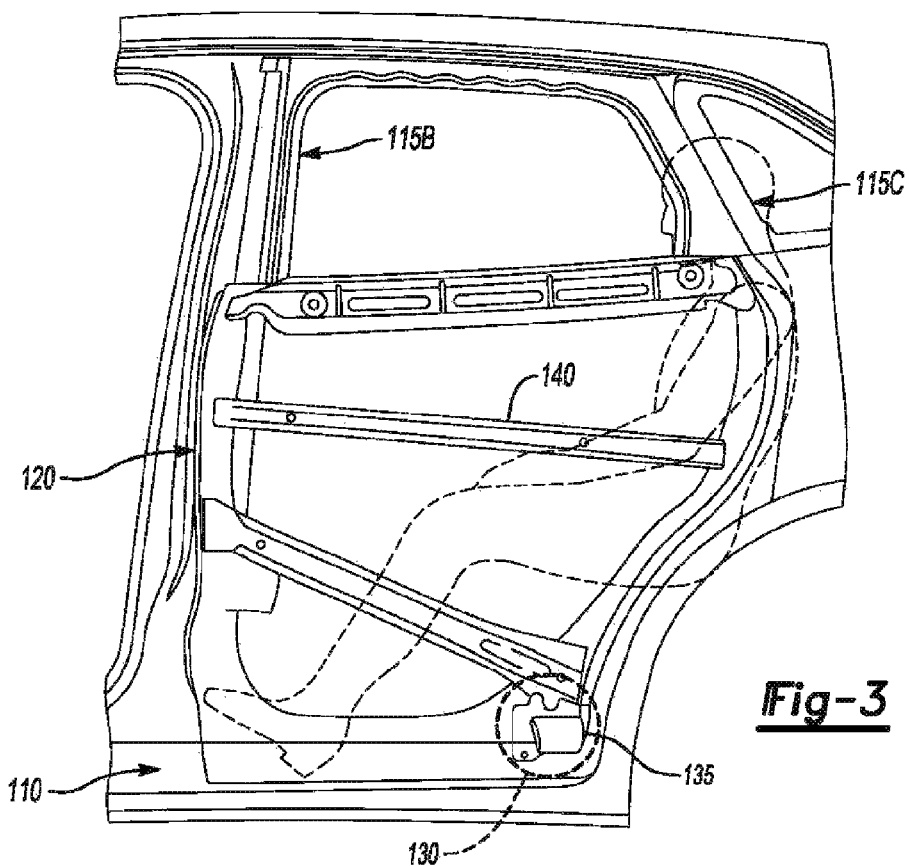
FIG. 3 illustrates the position of the intrusion mitigation door bracket relative to a passenger.

FIG. 3 illustrates the position of the intrusion mitigation door bracket 135 relative to a passenger located in the rear occupant area 105B. When the door 120 is closed, the bracket 135 may be disposed at intersection point 130C, near the intersection of the rocker panel 110 and the C-pillar 115C. At intersection point 130C, the bracket 135 may be positioned below the passenger's hips and outboard relative to the passenger compartment 105.

FIG. 4 illustrates the bracket 135 extending in an outboard direction relative to the passenger compartment 105 and having a lateral load-bearing surface 145 and a longitudinal load-bearing surface 150. The lateral load-bearing surface 145 may be generally perpendicular to the longitudinal load-bearing surface 150. For instance, when the door 120 is closed, the longitudinal load-bearing surface 150 may face forward and the lateral load-bearing surface 145 may generally face the left or right side relative to the vehicle passengers. The lateral load-bearing surface 145, as shown in FIG. 4, may be at least partially curved while the longitudinal load-bearing surface 150 may be at least partially planar. The lateral load-bearing surface 145 and the longitudinal load-bearing surface 150 may reduce intrusion propagation of the door 120 into the passenger compartment 105 and redirect an impact load along the rocker panel 110.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An intrusion mitigation system comprising:
   a rocker panel;
   a pillar reinforcement transverse to the rocker panel;
   a support brace having a spine and a flange; and
   a vehicle door having a bracket located over an intersection of the rocker panel and the pillar reinforcement when the door is in a closed position,
   wherein the bracket is configured to reduce intrusion propagation of the vehicle door toward a vehicle passenger compartment and redirect an impact load along the rocker panel, the support brace is connected to the vehicle door, the bracket is entirely located beneath the spine of the support brace, and the bracket includes a lateral load-bearing surface extending in an outboard direction relative to the vehicle passenger compartment and a longitudinal load-bearing surface extending in a forward direction relative to the vehicle passenger compartment arranged to redirect at least part of the impact load along the pillar reinforcement.

2. The intrusion mitigation system of claim 1, wherein the bracket is configured to reduce intrusion propagation toward a rear occupant area of the vehicle passenger compartment.

3. The intrusion mitigation system of claim 1, wherein the lateral load-bearing surface is generally perpendicular to the longitudinal load-bearing surface.

4. The intrusion mitigation system of claim 1, wherein the bracket extends in an outboard direction relative to the passenger compartment.

5. The intrusion mitigation system of claim 1, wherein the bracket extends in a direction transverse to the pillar reinforcement.

6. The intrusion mitigation system of claim 5, wherein the bracket extends in a generally perpendicular direction relative to the pillar reinforcement.

7. The intrusion mitigation system of claim 1, wherein the bracket is enclosed within the vehicle door.

8. The intrusion mitigation system of claim 1, wherein the bracket is disposed on an interior surface of the vehicle door.

9. An intrusion mitigation system comprising:
   a vehicle passenger compartment with a rear occupant area;
   a rocker panel;
   a pillar reinforcement transverse to the rocker panel;

a support brace having a spine and a flange; and a vehicle door having a bracket located within the vehicle door disposed in part along the rocker panel and disposed in part along the pillar reinforcement when the vehicle door is in a closed position, wherein the bracket is configured to reduce intrusion propagation of the vehicle door toward the rear occupant area and redirect an impact load along the rocker panel, the support brace is connected to the vehicle door, the bracket is entirely located beneath the spine of the support brace, and the bracket includes a lateral load-bearing surface extending in an outboard direction relative to the vehicle passenger compartment and a longitudinal load-bearing surface extending in a forward direction relative to the vehicle passenger compartment arranged to redirect at least part of the impact load along the pillar reinforcement.

10. The intrusion mitigation system of claim 9, wherein the lateral load-bearing surface is generally perpendicular to the longitudinal load-bearing surface.

11. The intrusion mitigation system of claim 9, wherein the bracket extends in an outboard direction relative to the vehicle passenger compartment.

12. The intrusion mitigation system of claim 9, wherein the bracket extends in a direction transverse to the pillar reinforcement.

13. The intrusion mitigation system of claim 12, wherein the bracket extends in a generally perpendicular direction relative to the pillar reinforcement.

14. The intrusion mitigation system of claim 9, wherein the bracket is disposed on an interior surface of the vehicle door.

15. An intrusion mitigation system comprising:

a rocker panel;

a pillar reinforcement transverse to the rocker panel;

a support brace having a spine and a flange formed as a unitary construction; and a vehicle door having a bracket disposed on an interior surface within the door wherein the bracket is configured to reduce intrusion propagation of the vehicle door toward a vehicle passenger compartment and redirect an impact load along the rocker panel, the support brace is connected to the vehicle door, and the bracket is entirely located beneath the spine of the support brace, and the bracket includes a lateral load-bearing surface extending in an outboard direction relative to the vehicle passenger compartment and a longitudinal load-bearing surface extending in a forward direction relative to the vehicle passenger compartment arranged to redirect at least part of the impact load along the pillar reinforcement;

further wherein the lateral load-bearing surface is at least partially curved and the longitudinal load-bearing surface is at least partially planar.

16. The intrusion mitigation system of claim 15, wherein the lateral load-bearing surface is generally perpendicular to the longitudinal load-bearing surface.

17. The intrusion mitigation system of claim 15, wherein the bracket and the flange overlap.

18. The intrusion mitigation system of claim 15, wherein the bracket extends in an outboard direction relative to the passenger compartment.

* * * * *